(12) United States Patent
Mohammed-Fakir et al.

(10) Patent No.: US 6,394,255 B1
(45) Date of Patent: May 28, 2002

(54) ROTARY MOTION LIMITING ARRANGEMENT

(75) Inventors: Abdul-Azeez Mohammed-Fakir, Schenectady; Mark Alan Johnson, Charlton, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/756,631

(22) Filed: Jan. 9, 2001

(51) Int. Cl.⁷ ................................................ F16D 11/04
(52) U.S. Cl. ................ 192/139; 192/142 R; 188/82.74; 188/82.77
(58) Field of Search ............................ 74/89, 469, 526; 188/82.74, 82.77, 82.9; 192/138, 139, 140, 142 R

(56) References Cited

U.S. PATENT DOCUMENTS

| 4,690,252 A | * | 9/1987 | Kottke et al. ................. 188/69 |
| 5,446,970 A | * | 9/1995 | McMurtry et al. ............ 33/572 |
| 5,624,013 A | * | 4/1997 | Tsai ............................. 192/8 R |
| 5,769,188 A | * | 6/1998 | Okabe et al. ............. 188/82.84 |
| 5,816,585 A | * | 10/1998 | Schenk ....................... 192/135 |

* cited by examiner

Primary Examiner—Christopher P. Schwartz
(74) Attorney, Agent, or Firm—Enrique Abarca; Donald S. Ingraham

(57) ABSTRACT

A rotary motion limiting arrangement includes a stationary component, a rotating component rotatable in opposite directions relative thereto, a pair of stops movably mounted on the stationary component for establishing a first set of opposite limits to rotational movement of the rotating component, and a link fastened to the stops such that, as one stop is moved between extended and retracted positions across and outside of a path of revolution of a lug on the rotating component the other stop is moved oppositely between retracted and extended positions. A braking mechanism is positioned, upon electrical energization, to halt rotation of the rotating component. Switches situated adjacent to the link and rotating component are electrically connected to the braking mechanism for establishing a second set of opposite limits to rotational movement of the rotating component within the limits of the first set.

18 Claims, 2 Drawing Sheets

ROTARY MOTION LIMITING ARRANGEMENT

BACKGROUND OF THE INVENTION

This invention relates to components which rotate and, more particularly, relates to a method and apparatus for imposing limits on the extent of rotation of a rotating component.

In some mechanisms having components which rotate, the components must rotate only within predetermined limits. These limits may fall within a range of up to 360 degrees, requiring some means to keep the rotation of the rotating component within the desired predetermined limits. Traditionally, stationary mechanical stops have been used to provide this function.

In the prior art, a set of stationary stops are often provided for setting limits to the extent of rotary motion of a rotating component. The rotating component may include a lug which protrudes outwardly and moves in a given path of revolution about the axis of rotation of the rotating component. Left and right stops are mounted to a stationary component adjacent the rotating component and extend across the path of revolution of the lug. When the rotating component rotates in one direction, the lug eventually hits one of the stops, preventing the rotating component from rotating any farther in that direction. When the rotating component reverses its direction of rotation, the lug eventually hits another of the stops, halting rotation of the rotating in the reverse direction. Thus, the stops limit the extent of rotational motion of the rotating component to less than 360 degrees.

A problem exists, however, when the rotating component must have a range of motion which is greater than 360 degrees. The traditional stops fail to provide a solution if the rotating component must have range of motion with predetermined limits greater than 360 degrees apart from one another. Consequently, a need remains for an arrangement that solves the aforementioned problem without introducing any new problems in its place.

BRIEF SUMMARY OF THE INVENTION

A rotary motion limiting arrangement designed to satisfy the aforementioned need allows a rotating component to have a desired range of rotational motion within predetermined limits spaced apart by greater than 360 degrees and less than 720 degrees. For applications requiring only a single level of safety in limiting the rotating component to the desired range of rotational movement, the rotary motion limiting arrangement may utilize movable mechanical stops only. For applications requiring two levels of safety, the rotary motion limiting arrangement will utilize a plurality of electrical switches in conjunction with the movable stops. The electrical switches provide the first or primary level of safety while the movable stops provide the second or secondary level of safety.

In one embodiment of the invention, a rotary motion limiting arrangement comprises a stationary component, a rotating component with a first lug, a pair of stops and a link interconnecting the stops. The rotating component is rotatable in opposite directions relative to the stationary component and has a lug thereon movable along a path of revolution with rotational movement of the rotating component. The stops are mounted on the stationary component at angularly spaced locations about the rotating component and are movable between extended and retracted positions respectively across and outside of the path of revolution of the lug on the rotating component. The link which interconnects the stops is movable with the stops such that in response to contact of the lug with a stop during rotational movement of the rotating component in a first direction the stop is moved from the extended position to the retracted position and concurrently the other of the stops is moved from the retracted position to the extended position such that the lug continues past the one stop and stops at the other stop, thus establishing a limit to the rotational movement of the rotating component in the first direction. In response to contact of the lug with a stop during rotational movement of the rotating component in a second, opposite direction, the other stop is moved from the extended position to the retracted position and the one stop is moved from the retracted position to the extended position such that the lug continues past the other stop and stops at the one stop, so as to establish a limit to the rotational movement of the rotating component in the second direction. A range of limits to the rotational movement of the rotating component is thereby provided by placement of the stops at selected angularly spaced locations about the rotating component. Moreover, the opposite limits to the rotational movement of the rotating component are separated by greater than 360 degrees and less than 720 degrees from one another. The arrangement further comprises a pair of sleeves mounted on the stationary component and disposed at the angularly spaced locations about the rotating component. Each of the sleeves has an interior bore extending between opposite open inner and outer ends such that the inner ends of the sleeves are disposed adjacent to the rotating component and the outer ends of the sleeves are disposed remote from the rotating component. Each of the stops extends through the interior bore of a respective one of the sleeves such that an outer end of the stop protrudes from the outer end of one sleeve and is attached to the link, while an inner end of the stop is extendible and retractible relative to the inner end of the one sleeve upon movement of the stop relative to the rotating component.

In another exemplary embodiment of the invention, the rotary motion limiting arrangement comprises the above defined components and, in addition thereto, a second lug on the rotating component, a braking mechanism disposed adjacent to the rotating component, and a plurality of switches mounted to the stationary component and electrically connected to the braking mechanism. The first lug follows a first path of revolution with rotation of the rotating component while the second lug follows a second and different path of revolution with rotation of the rotating component. The stops and link function to establish a first set of opposite limits for the rotational movement of the rotating component. The switches are disposed adjacent to the link and the second path of revolution of the second lug on the rotating component, and are operable in response to contact with the link and the second lug during rotational movement of the rotating component in the first and second directions in order to establish a second set of opposite limits for the rotational movement of the rotating component, which are within the first set of opposite limits.

The plurality of switches includes first and second pairs of switches that are activatable between electrically off and on positions for electrically actuating a braking mechanism from a release condition to a braking condition relative to the rotating component, in order to mechanically halt rotation of the rotating component. Each of the first switches is disposed adjacent to one of the stops such that when the stops are in their extended positions the link does not contact the first switches, leaving the first switches in their off positions.

When the stops are in their retracted positions, the link contacts the first switches, thereby actuating the first switches to their on positions. The second switches are disposed adjacent to the rotating component and at angularly spaced locations from one another. Each respective one of the second switches is also disposed closer to one of the stops than to the other of the stops and extends across the second path of revolution of the second lug on the rotating component such that the second switches are in their off positions when not contacted by the second lug and are actuated to their on positions when contacted by the second lug. When both the first switch adjacent to one of the stops and the second switch closer to the other of the stops are contacted respectively by the link and second lug on the rotating component, these switches are activated and the braking mechanism is electrically actuated from the release condition to the braking condition, halting the rotational movement of the rotating component.

DETAILED DESCRIPTION OF THE INVENTION

Figure 1:
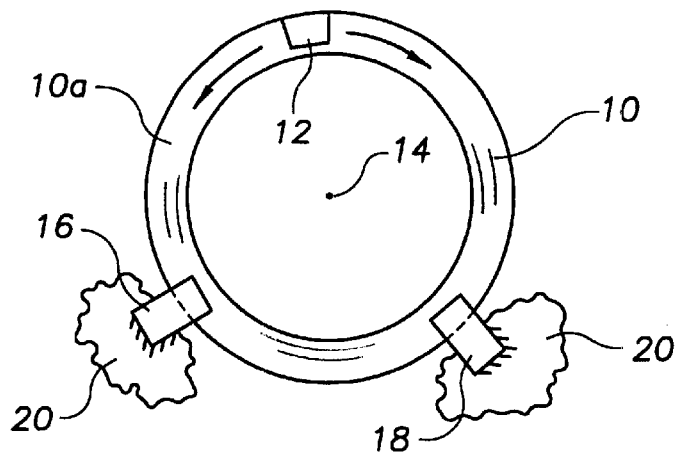
FIG. 1 is a diagrammatic view of a prior art rotary motion limiting arrangement which limits a rotating component to a range of rotational motion of less than 360 degrees.

FIG. 1 illustrates a prior art arrangement wherein a set of stationary stops set limits to the rotary motion of a rotating component 10. A lug 12 protrudes from a face 10a of the rotating component and moves in a given path of revolution about an axis 14 together with the rotating component. Left and right stops 16, 18, mounted to a stationary component 20 adjacent to rotating component 10, extend across the path of revolution of lug 12. When the rotating component rotates counterclockwise, lug 12 eventually hits the left stop 16, halting the counterclockwise rotation of component 10. When component 10 reverses its direction and rotates clockwise, lug 12 eventually hits the right stop 18, halting the clockwise rotation of component 10. In this manner, the left and right stops 16, 18 limit the rotational motion of rotating component 10 to a range of motion that is less than 360 degrees.

Figure 2:
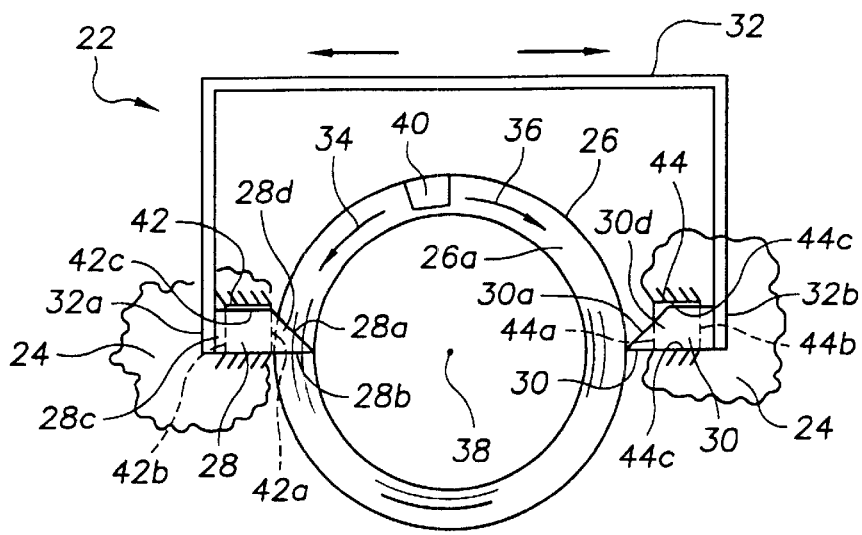
FIG. 2 is a diagrammatic view of one embodiment of a rotary motion limiting arrangement of the invention which limits a rotating component to a range of rotational motion of greater than 360 degrees and less than 720 degrees.
Figure 3:
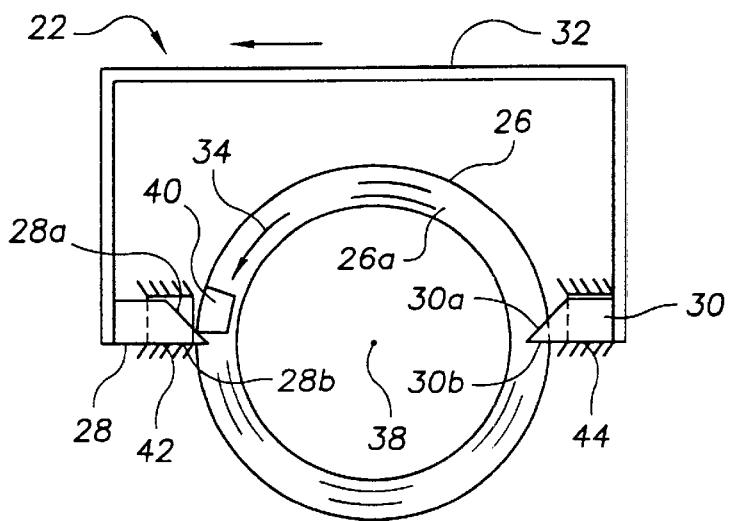
FIG. 3 is a diagrammatic view of the arrangement of FIG. 2 now showing a lug on the rotating component contacting a cam surface of one stop so as to cause the one stop to move from an extended position to a retracted position and a link to move left and cause the other stop to move from a retracted position to an extended position.
Figure 4:
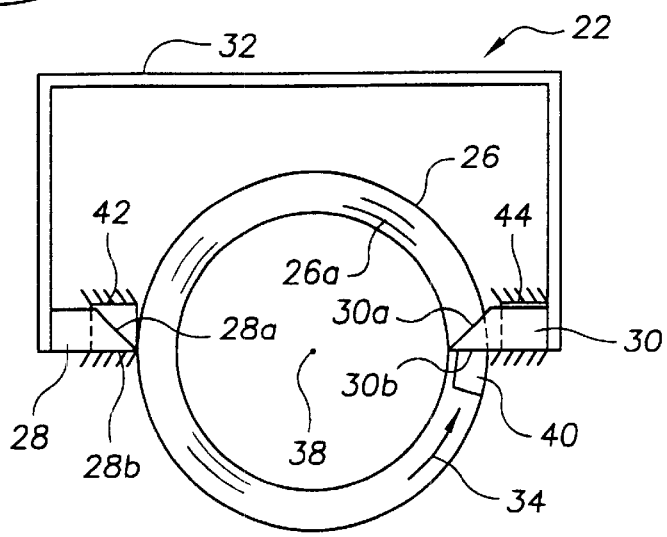
FIG. 4 is a diagrammatic view of the arrangement of FIG. 2 now showing the lug on the rotating component contacting an abutment surface of the other stop so as to bring the rotating component to a halt.

FIGS. 2 to 4 illustrate one embodiment 22 of a rotary motion limiting arrangement of the invention. A rotating component 26, having any suitable configuration, such as that of a cylinder, is disposed adjacent to a stationary component 24 and is capable of rotating in either direction 34 or 36 about a rotational axis 38. A single lug 40, which protrudes from an end face 26a of rotating component 26, revolves in either one of directions 34, 36 along a path of revolution about axis 38 with the corresponding rotation of rotating component 26.

Each one of a pair of substantially identical mechanical stops 28, 30 has a cam surface 28a, 30a, respectively, on one side thereof, oriented in an inclined or acute angular relationship to the path of revolution of lug 40, and an abutment surface 28b, 30b, respectively, on an opposite side thereof, oriented in a generally perpendicular relationship to the path of revolution of lug 40. The inclined cam surfaces 28a, 30a of the respective left and right stops 28, 30 face in opposite directions relative to the path of revolution of lug 40. The abutment surfaces 28b, 30b of respective stops 28, 30 similarly face in opposite directions relative to the path of revolution of lug 40.

The left and right stops 28, 30 are disposed adjacent to, and at desired angularly spaced locations about, rotating component 26 so as to define the desired opposite limits to the rotational movement of the rotating component. Substantially identical left and right sleeves 42, 44, respectively, are mounted on stationary component 24 at the angularly spaced locations of stops 28, 30. Each of sleeves 42, 44 has opposite open inner and outer ends 42a, 42b and 44b, 44b, respectively, and defines an interior bore 42c, 44c, respectively, extending therebetween such that the inner ends of sleeves 42, 44 are disposed adjacent to rotating component 26 and the outer ends of sleeves 42, 44 are disposed remote from rotating component 26. The left and right stops 28, 30 are mounted through the bores of the respective sleeves 42, 44 so that the stops can undergo linear sliding movement between extended and retracted positions relative to rotating component 26. Thus the stops can be disposed respectively across, or outside of, the path of revolution of lug 40 such that lug 40 contacts stops 28, 30 when they are extended but does not contact the stops when they are retracted. More particularly, stops 28, 30 are disposed through the interior bores of sleeves 42, 44, respectively, such that outer ends 28c, 30c of stops 28, 30, respectively, protrude from the outer ends 42b, 44b, respectively, of sleeves 42, 44 and are affixed to the opposite ends 32a, 32b of a link 32, while inner ends 28d, 30d of stops 28, 30, respectively, are extendible and retractible relative to the inner ends 42a, 44a, respectively, of sleeves 42, 44, respectively.

Link 32 has a rigid, preferably U-shaped configuration, so as to extend between, and interconnect, left and right stops 28, 30 at its left and right ends 32a, 32b, respectively. The link can be slidably mounted to stationary component 24 but in any event moves concurrently with stops 28, 30 between laterally displaced positions, namely, a right position shown in FIG. 2 and a left position shown in FIGS. 3 and 4. When link 32 is in the right position of FIG. 2, left stop 28 is in the extended position and right stop 30 is in the retracted position, relative to the path of revolution of lug 40. When link 32 is in the left position shown in FIGS. 3 and 4, left stop 28 is in the retracted position and right stop 30 is in the extended position, relative to the path of revolution of lug 40. Thus movement of link 32 between its right and left laterally displaced positions moves stops 28, 30 simultaneously between their respective positions such that as one of the stops is moved to the extended position the other of the stops, via link 32, is moved to the retracted position, and vice versa.

As component 26 rotates and lug 40 thereon moves in the counterclockwise direction of arrow 34, lug 40 produces the aforementioned linear sliding movement of stops 28, 30 and link 32 from a right to left position when lug 40 contacts cam surface 28a of left stop 28 when the stop is in its extended position. Such moving contact with inclined cam surface 28a of stop 28 causes the stop to move to the left from its extended position shown in FIG. 2 to its retracted position shown in FIG. 3. This, in turn, causes right stop 30 to also move to the left from its retracted position shown in FIG. 2 to its extended position shown in FIG. 3 as link 32 moves to its left position (shown in FIG. 3) from its right position shown in FIG. 2.

As lug 40 and rotating component 26 continue rotating in the counterclockwise direction of arrow 34, lug 40 passes the retracted left stop 28 and eventually comes into contact with the now-extended right stop 30, as shown in FIG. 4. In this position, the abutment surface 30b of right stop 30 extends across the path of revolution of lug 40, halting the movement of lug 40 and rotating component 26. Upon reversal of rotation of rotating component 26 in the clockwise direction of arrow 36 (FIG. 2) lug 40 passes the retracted left stop 28 and eventually comes into contact with right stop 30 which is still disposed in its extended position, but now contacts cam surface 30a of the right stop, causing the right stop to move to its retracted position shown in FIG. 2. As the rotating component 26 and lug 40 continue to move in the clockwise direction of arrow 36, lug 40 passes the now retracted right stop 30 and eventually comes into contact with abutment surface 28b of left stop 28, which is now in its extended position, thus causing the movement of lug 40 and rotating component 26 to come to a halt. In such manner, the abutment surfaces 28b, 30b of respective stops 28, 30 establish the opposite limits for a desired range of rotational movement of rotating component 26. Depending on the specific angularly-displaced locations selected for the left and right stops, the limits of the range of rotational movement of rotating component 26 established by stops 28, 30 lie between values greater than 360 degrees and less than 720 degrees.

Figure 5:
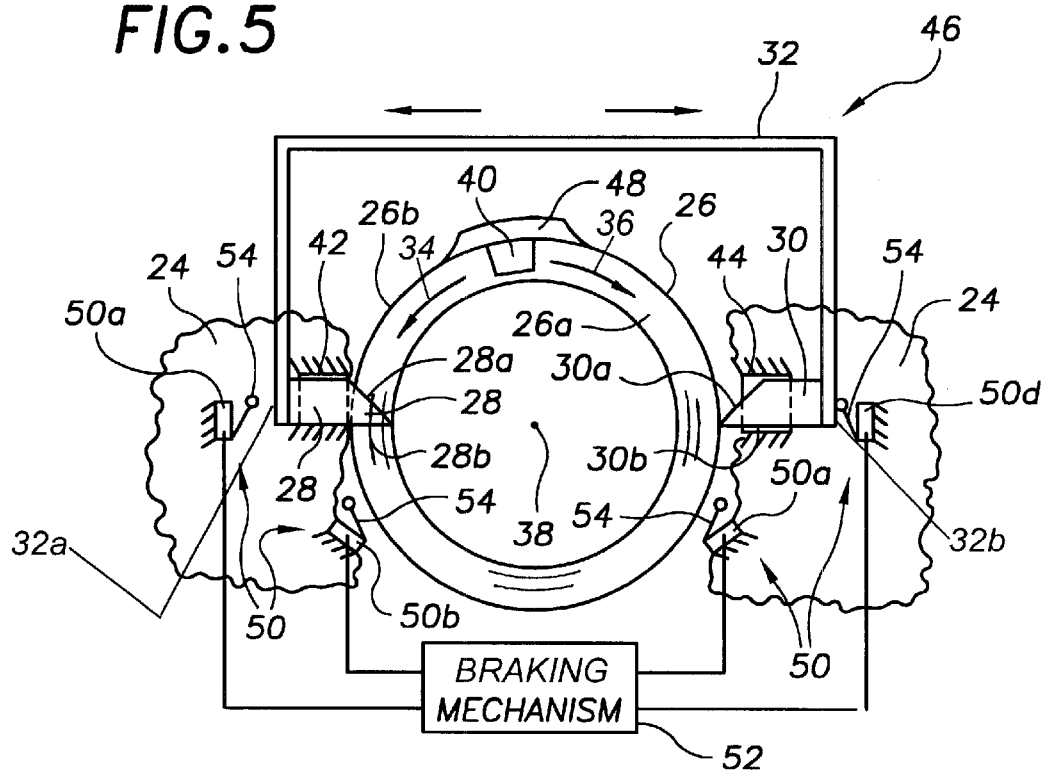
FIG. 5 is a diagrammatic view of another embodiment of the rotary motion limiting arrangement of the present invention providing a first and second set of opposite limits to rotational movement of the rotating component, wherein the second set of opposite limits is within the first set of opposite limits.

FIG. 5 illustrates another embodiment 46 of the rotary motion limiting arrangement of the invention. The arrangement 46 of FIG. 5 includes the same stationary and rotating components, stops, sleeves, and link as included in arrangement 22 of FIGS. 2 to 4. Arrangement 46 of FIG. 5, however, further includes a second lug 48 mounted on outer peripheral surface 26b of rotating component 26 so as to revolve in the same direction as first lug 40, but along a second path of revolution different from the first path of revolution traveled by the first lug 40, a plurality of electrical switches 50, and a braking mechanism 52 which, when energized, is adapted to halt rotation of rotating component 26 and which is electrically connected to the electrical switches. The electrical switches and braking mechanism cooperate to provide a first level of safety, that is, provide a first set of limits to the rotational movement of rotating component 26. Mechanical stops 28, 30 cooperate to provide a second level of safety, that is, provide a second set of limits to the rotational movement of rotating component 26 which are inclusive of the first set of limits and thus are only used if any of switches 50 establishing the first set of limits should fail.

As described above, the first lug 40 follows the first path of revolution with rotation of rotating component 26 and is intersected by the left or right stop only when that stop is in its extended position. The second lug 48 follows the second path of revolution with rotation of the rotating component which is intersected only by actuatable fingers 54 of switches 50. Stops 28, 30 and link 32 function to establish the first set of limits to the rotational movement of rotating component 26 in the manner described earlier. Switches 50 are disposed adjacent to opposite ends 32a, 32b of link 32, which respectively connect to the left and right stops 28, 30, and adjacent to the second path of revolution of second lug 48 on rotating component 26, and are operable in response to contact with link 32 and second lug 48 during the rotational movement of rotating component 26 for establishing a second set of opposite limits to the rotational movement of rotating component 26 within the first set of opposite limits established by stops 28, 30 and link 32.

The plurality of electrical switches 50 includes a pair of first switches 50a, 50d and a pair of second switches 50b, 50c all electrically connected to braking mechanism 52. Each of switches 50a–50d is normally in an electrically off state and is activatable momentarily from the off state to an electrically on state by contacting actuatable finger 54 of the respective switch. When selected ones of switches 50a–50d are actuated to their on states in a predetermined sequence, braking mechanism 52 is electrically actuated from a release condition to a braking condition mechanically halting the rotation of rotating component 26 in a conventionally known manner.

The first switches 50a, 50d are disposed adjacent to the opposite ends 32a, 32b, respectively, of link 32 and stops 28, 30 attached thereto, respectively, such that when either of stops 28, 30 is in its extended position, link 32 does not contact fingers 54 of the one of first switches 50a, 50d, associated with the extended stop, and that switch thereby remains in its off state whereas, when either of stops 28, 30 is in its retracted position, link 32 contacts fingers 54 of the one of first switches 50a, 50d, associated with the retracted stop, momentarily actuating that first switch to its on state.

The second switches 50b, 50c are disposed at angularly spaced locations from one another about rotating component 26. Second switches 50b, 50c are also disposed, respectively, closer to respective one of stops 28 and 30, and their fingers 54 extend across the second path of revolution of second lug 48 on rotating component 26. Before second lug 48 contacts the fingers 54 of second switches 50b, 50c, they remain in their off states whereas, when the second lug contacts the fingers of either one of second switches 50b, 50c, that switch is actuated to its on state. Thus, as rotating component 26 along with first lug 40 and second lug 48 move in the counterclockwise direction of arrow 34, when one firs t switch 50a has been contacted by the left end 32a of link 32 and left stop 28, and one second switch 50c has thereafter been contacted by second lug 48 such that switches 50a, 50c have been at least momentarily activated in succession to their on positions, braking mechanism 52, in response thereto, is electrically actuated from the release condition to the braking condition, and the counterclockwise rotational movement of rotating component 26 is halted.

As rotating component 26 and thus first lug 40 and second lug 48 are subsequently actuated to move in the clockwise direction of arrow 36, when the first switch 50d adjacent to the right end 32b of link 32 and right stop 30 and then the second switch 50b adjacent to the left stop 28 have been contacted in succession by link 32 and second lug 48 so that switches 50d, 50b have been at least momentarily activated in succession to their on states, braking mechanism 52, in response thereto, is electrically actuated from the release condition to the braking condition, and the clockwise rotational movement of rotating component 26 is halted.

In the foregoing manner, switches 50 establish the second set of limits on the range of rotational motion of rotating component 26 in arrangement 46. It can be seen that if any one or more of switches 50 should fail, then one or both of mechanical stops 28, 30 will function to effectuate one or both of the limits of the first set thereof on the range of motion of rotating component 26. That is, the first lug 40 on counterclockwise rotating component 26 contacts abutment surface 30b of the right stop 30 when one or both of the first and second switches 50a, 50c fail. The first lug 40 on clockwise rotating component 26 contacts the abutment surface 28b of the left stop 28 when one or both of the first and second switches 50b, 50d fail. One or both of abutment surfaces 28b, 30b of the respective left and right stops 28, 30 thereby establish one or both limits on the range of rotational movement of rotating component 26 when one or more of switches 50 fail. Thus, switches 50 provide the first level of safety and stops 28, 30 provide the second, or backup, level of safety.

The locations of stops 28, 30 and of switches 50 can be adjusted about rotating component 26 in order to achieve different limits on the range of motion of rotating component 26. In any event, the selected limits on the range of motion of rotating component 26 are always between 360 degrees and 720 degrees. The range of motion of rotating component 26 shown in FIGS. 2 to 4 is about 540 degrees, though it need not be so limited.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A rotary motion limiting arrangement, comprising:
    a stationary component;
    a rotating component rotatable in either of opposite directions relative to said stationary component and having a lug thereon movable along a path of revolution with rotational movement of said rotating component;
    a pair of stops mounted on said stationary component at angularly spaced locations about said rotating component and movable between extended and retracted positions across and outside of said path of revolution of said lug; and
    a link interconnecting and movable with said stops such that in response to contact of said lug with one of said stops during clockwise rotational movement of said rotating component said one of said stops is moved from said extended position to said retracted position and concurrently the other of said stops is moved from said retracted position to said extended position such that said lug passes by said one stop and is halted at said other of said stops so as to establish a limit to the extent of clockwise rotational movement of said rotating component whereas in response to contact of said lug with said other stop during counterclockwise rotational movement of said rotating component said other stop is moved from said extended position to said retracted position and said one stop is moved from said retracted position to said extended position such that said lug passes by said other stop and is halted at said one stop so as to establish a limit to the counterclockwise rotational movement of said rotating component in said second direction, whereby a range of opposite limits to the rotational movement of said rotating component is provided by placement of said stops at selected ones of said angularly spaced locations about said rotating component.

2. The arrangement of claim 1 in which said opposite limits to the rotational movement of said rotating component are separated by greater than 360 degrees from one another.

3. The arrangement of claim 2 in which said opposite limits to the rotational movement of said rotating component are separated by less than 720 degrees from one another.

4. The arrangement of claim 1 further comprising:
    a pair of sleeves mounted on said stationary component and disposed at said angularly spaced locations about said rotating component, each of said sleeves having opposite open inner and outer ends and an interior bore extending between said inner and outer ends such that said inner ends of said sleeves are disposed adjacent to said rotating component and said outer ends of said sleeves are disposed remote from said rotating component.

5. The arrangement of claim 4 in which each of said stops is disposed through the interior bore of a respective one of said sleeves such that an outer end of a respective one of said stops protrudes from the outer end of said respective one of said sleeves and is attached to said link, and an inner end of said respective one of said stops is extendible and retractible relative to said inner end of said respective one of said sleeves upon movement of said respective one of said stops relative to said rotating component.

6. A rotary motion limiting arrangement, comprising:
    a stationary component;
    a rotating component having a lug and capable of rotating in either one of opposite directions about an axis, said lug protruding from said rotating component and capable of rotating therewith in either one of said opposite directions along a path of revolution about said axis;
    a pair of stops mounted on said stationary component at angularly spaced locations about said rotating component, each of said stops having a cam surface on one side and an abutment surface on an opposite side such that said cam surfaces face in opposite directions relative to the path of revolution of said lug and said abutment surfaces face in opposite directions relative to the path of revolution of said lug, said stops being moveable between extended and retracted positions relative to said rotating component so that said stops are correspondingly disposed across and outside of said path of revolution of said lug and so that said lug correspondingly contacts and passes by a first one of said stops respectively; and
    a link extending between, and affixed to, said stops for undergoing movement in opposite directions between first and second displaced positions and concurrently with said stops such that as one of said stops is moved by contact with said lug to said extended position the other of said stops is moved to said retracted position and vice versa;
    said lug producing movement of said stops and link when said lug, being carried along said path of revolution, contacts the cam surface of one of said stops in said extended position so as to cause said one of said stops to move from said extended position to said retracted position and, in turn, causes the other of said stops to move from said retracted position to said extended position as said link is caused to move from one of said first and second displaced positions to the other of said first and second displaced positions, and
    said lug causing said rotating component to halt when said lug, being carried along said path of revolution, contacts the abutment surface of said other of said stops in said extended position, whereby said abutment surfaces of said respective stops in said extended positions establish opposite limits to the extent of rotational movement of said rotating component in said opposite directions.

7. The arrangement of claim 6 in which said opposite limits to the rotational movement of said rotating component are separated by greater than 360 degrees from one another.

8. The arrangement of claim 7 in which said opposite limits to the rotational movement of said rotating component are separated by less than 720 degrees from one another.

9. The arrangement of claim 6 further comprising:
a pair of sleeves mounted on said stationary component and disposed at said angularly spaced locations about said rotating component, each of said sleeves having opposite open inner and outer ends and an interior bore extending between said inner and outer ends such that said inner ends of said sleeves are disposed adjacent to said rotating component and said outer ends of said sleeves are disposed remote from said rotating component.

10. The arrangement of claim 9 in which each of said stops is disposed through the interior bore of a respective one of said sleeves such that an outer end of said respective one of said stops protrudes from the outer end of said respective one of said sleeves and is attached to said link, and an inner end of said respective one of said stops is extendible and retractible relative to said inner end of said respective one of said sleeves upon movement of said respective one of said stops relative to said rotating component.

11. A rotary motion limiting arrangement, comprising:
a stationary component;
a rotating component rotatable in either of opposite directions relative to said stationary component and having first and second lugs thereon correspondingly movable along first and second paths of revolution with rotation of said rotating component;
a pair of stops mounted on said stationary component and movable between extended and retracted positions across and outside of said first path of revolution of said first lug;
a link interconnecting and movable with said stops such that in response to contact of said first lug with one of said stops during clockwise rotational movement of said rotating component said one of said stops is moved from said extended position to said retracted position and concurrently the other of said stops is moved from said retracted position to said extended position such that said first lug passes by the one stop and is halted at the other stops whereas in response to contact of said first lug with the other stop during counterclockwise rotational movement of said rotating component the other stop is moved from said extended position to said retracted position and the one stop is moved from said retracted position to said extended position such that said first lug passes by the other stop and is halted at the one stop, thereby establishing a first set of opposite limits to rotational movement of said rotating component;
a braking mechanism positioned to halt rotation of said rotating component when said mechanism is electrically energized;
a plurality of switches electrically connected to said braking mechanism and disposed adjacent to said link and said second path of revolution of said second lug and being switchable between off and on states and operable in response to contact with said link and said second lug during said rotational movement of said rotating component for establishing a second set of opposite limits to said rotational movement of said rotating component within said first set of opposite limits to rotational movement of said rotating component.

12. The arrangement of claim 11 in which the opposite limits of said first set are separated by greater than 360 degrees from one another.

13. The arrangement of claim 12 in which the opposite limits of said first set are separated by less than 720 degrees from one another.

14. The arrangement of claim 11 further comprising:
a pair of sleeves mounted on said stationary component and disposed at said angularly spaced locations about said rotating component, each of said sleeves having opposite open inner and outer ends and an interior bore extending between said inner and outer ends such that said inner ends of said sleeves are disposed adjacent to said rotating component and said outer ends of said sleeves are disposed remote from said rotating component.

15. The arrangement of claim 14 in which each of said stops is disposed through the interior bore of a respective one of said sleeves such that an outer end of a respective one of said stops protrudes from the outer end of said respective one of said sleeves and is attached to said link, and an inner end of said respective one of said stops is extendible and retractible relative to said inner end of said respective one of said sleeves upon movement of said respective one of said stops relative to said rotating component.

16. The arrangement of claim 11 in which said plurality of switches includes a pair of first switches mounted to said stationary component, each of said first switches being disposed adjacent to a separate one of said stops, respectively, such that when either of said stops is in said extended position said link does not contact a corresponding one of said first switches, thereby leaving the corresponding one of said first switches in said off state whereas when either of said stops is in said retracted position said link contacts a corresponding one of said first switches, thereby actuating the corresponding one of said first switches to said on state.

17. The arrangement of claim 16 in which said plurality of switches further includes a pair of second switches mounted to said stationary component, each of said second switches being disposed at angularly spaced locations from one another about said rotating component and closer to a respective one of said stops than the other and extending across the second path of revolution of said second lug such that when said second lug does not contact one of said second switches, said one of said second switches is in said off state whereas when said second lug contacts one of said second switches, said one of said second switches is actuated to said on state.

18. The arrangement of claim 17 in which when the one of said first switches adjacent to one of said stops and the one of said second switches closest to said one of said first switches are contacted respectively by said link and said second lug, said braking mechanism is electrically actuated from a release condition to said braking condition, halting rotational movement of said rotating component.

* * * * *